United States Patent
Strongin et al.

(10) Patent No.: US 7,206,933 B2
(45) Date of Patent: *Apr. 17, 2007

(54) SOFTWARE MODEM WITH PRIVILEGED MODE DRIVER AUTHENTICATION

(75) Inventors: Geoffrey S. Strongin, Austin, TX (US);
David W. Smith, Cedar Park, TX (US);
Brian C. Barnes, Round Rock, TX (US); Terry L. Cole, Austin, TX (US);
Rodney Schmidt, Austin, TX (US);
Michael Barclay, Swallowcliffe (GB)

(73) Assignee: Advanced Micro Devices, Inc., Austin, TX (US)

( * ) Notice: Subject to any disclaimer, the term of this patent is extended or adjusted under 35 U.S.C. 154(b) by 1012 days.

This patent is subject to a terminal disclaimer.

(21) Appl. No.: 09/901,212

(22) Filed: Jul. 9, 2001

(65) Prior Publication Data

US 2003/0009677 A1 Jan. 9, 2003

(51) Int. Cl.
*H04L 9/00* (2006.01)
*G06F 7/04* (2006.01)
*H04K 1/00* (2006.01)

(52) U.S. Cl. .................. 713/168; 713/152; 713/189; 713/194; 726/6; 380/266; 380/271

(58) Field of Classification Search ............. 713/168
See application file for complete search history.

(56) References Cited

U.S. PATENT DOCUMENTS 5,343,527 A * 8/1994 Moore ................. 713/179

5,390,301 A * 2/1995 Scherf .................. 719/321
5,794,164 A * 8/1998 Beckert et al. .......... 455/3.06
5,901,311 A * 5/1999 Labatte et al. ............. 713/2
6,149,522 A 11/2000 Alcorn et al. ............. 463/29

(Continued)

FOREIGN PATENT DOCUMENTS

EP 0 898 216 2/2000

(Continued)

OTHER PUBLICATIONS

Facchinetti et al, Non-Preemptive Interrupt Scheduling for Safe Reuse of Legacy Drivers in Real-Time Systems, 2005, IEEE.*

(Continued)

*Primary Examiner*—Ayaz Sheikh
*Assistant Examiner*—Aravind K Moorthy
(74) *Attorney, Agent, or Firm*—Williams, Morgan & Amerson, P.C.

(57) ABSTRACT

A computer system includes a peripheral device and a processing unit. The processing unit is adapted to execute a driver for interfacing with the peripheral device in a standard mode of operation and an authentication agent in a privileged mode of operation, wherein the authentication agent includes program instructions adapted to authenticate the driver. The peripheral device may comprise a communications device, such as a software modem. A method for identifying security violations in a computer system includes executing a driver in a standard processing mode of a processing unit; transitioning the processing unit into a privileged processing mode; and authenticating the driver in the privileged processing mode. The driver may be adapted for interfacing with a communications peripheral device, such as a software modem.

41 Claims, 4 Drawing Sheets

U.S. PATENT DOCUMENTS

| | | | |
|---|---|---|---|
| 6,367,018 B1 * | 4/2002 | Jain | 713/201 |
| 6,973,566 B2 * | 12/2005 | Smith et al. | 713/151 |
| 7,073,173 B1 * | 7/2006 | Willman | 718/1 |
| 2004/0194081 A1 * | 9/2004 | Qumei et al. | 717/173 |

FOREIGN PATENT DOCUMENTS

| | | |
|---|---|---|
| WO | WO 00/22865 | 4/2000 |
| WO | WO 01/35206 | 5/2001 |
| WO | WO 01/42889 | 6/2001 |
| WO | WO 2004070571 A2 * | 8/2004 |

OTHER PUBLICATIONS

International Search Report dated Nov. 28, 2003 (PCT/US02/1853;TT4046-PCT).

* cited by examiner

SOFTWARE MODEM WITH PRIVILEGED MODE DRIVER AUTHENTICATION

BACKGROUND OF THE INVENTION

1. Field of the Invention

This invention relates generally to modem communications and, more particularly, to a software modem with privileged mode driver authentication.

2. Description of the Related Art

In recent years cellular telephones have become increasingly popular. A cellular telephone is one example of what is referred to as a "mobile station" or "mobile terminal." A mobile station can take on various forms other than a cellular telephone, including a computer (e.g., a notebook computer) with mobile communication capabilities.

Telecommunications services are provided between a cellular telecommunications network and a mobile station over an air interface, e.g., over radio frequencies. Typically, each subscriber having a mobile station is assigned a unique International Mobile Subscriber Identity (IMSI). At any moment, an active mobile station may be in communication over the air interface with one or more base stations. The base stations are, in turn, managed by base station controllers, also known as radio network controllers. A base station controller together with its base stations comprise a base station system. The base station controllers of a base station system are connected via control nodes to a core telecommunications network, such as the publicly switched telephone network (PSTN). One type of standardized mobile telecommunications scheme is the Global System for Mobile communications (GSM). GSM includes standards that specify functions and interfaces for various types of services. GSM systems may be used for transmitting both voice and data signals.

A particular base station may be shared among multiple mobile stations. Because the radio spectrum is a limited resource, the bandwidth is divided using combination of Time-Division and Frequency-Division Multiple Access (TDMA/FDMA). FDMA involves dividing the maximum frequency bandwidth (e.g., 25 MHz) into 124 carrier frequencies spaced 200 kHz apart. A particular base station may be assigned one or more carrier frequencies. Each carrier frequency is, in turn, divided into time slots. During an active session between the base station and the mobile station, the base station assigns the mobile unit a frequency, a power level, and a time slot for upstream transmissions from the mobile station to the base station. The base station also communicates a particular frequency and time slot for downstream transmissions from the base station destined for the mobile station.

The fundamental unit of time defined in GSM is referred to as a burst period, which lasts $15/26$ ms (or approx. 0.577 ms). Eight burst periods are grouped into a TDMA frame ($120/26$ ms, or approx. 4.615 ms), which is the basic unit for the definition of logical channels. One physical channel is defined as one burst period per frame. Individual channels are defined by the number and position of their corresponding burst periods.

GSM frames, each frame having 8 burst periods, are grouped into superframes (e.g., groups of 51 frames) that include both traffic (i.e., voice or data signals) and control information. The control information is conveyed over common channels defined in the superframe structure. Common channels can be accessed both by idle mode and dedicated mode mobile stations. The common channels are used by idle mode mobile stations to exchange signaling information for changing to dedicated mode in response to incoming or outgoing calls. Mobile stations already in the dedicated mode monitor the surrounding base stations for handover and other information.

The common channels include:
- a Broadcast Control Channel (BCCH) used to continually broadcasts information including the base station identity, frequency allocations, and frequency-hopping sequences;
- a Frequency Correction Channel (FCCH) and Synchronization Channel (SCH) used to synchronize the mobile station to the time slot structure of a cell by defining the boundaries of burst periods, and the time slot numbering (i.e., every cell in a GSM network broadcasts exactly one FCCH and one SCH, which are, by definition, sent on time slot number 0 within a TDMA frame);
- a Random Access Channel (RACH) used by the mobile station to request access to the network;
- a Paging Channel (PCH) used to alert the mobile station of an incoming call; and
- an Access Grant Channel (AGCH) used to allocate a Stand-alone Dedicated Control Channel (SDCCH) to a mobile station for signaling (i.e., to obtain a dedicated channel) following a request on the RACH.

For security reasons, GSM data is transmitted in an encrypted form. Because a wireless medium can be accessed by anyone, authentication is a significant element of a mobile network. Authentication involves both the mobile station and the base station. A Subscriber Identification Module (SIM) card is installed in each mobile station. Each subscriber is assigned a secret key. One copy of the secret key is stored in the SIM card, and another copy is stored in a protected database on the communications network that may be accessed by the base station. During an authentication event, the base station generates a random number that it sends to the mobile station. The mobile station uses a random number, in conjunction with the secret key and a ciphering algorithm (e.g., A3), to generate a signed response that is sent back to the base station. If the signed response sent by the mobile station matches the one calculated by network, the subscriber is authenticated. The base station encrypts data transmitted to the mobile station using the secret key. Similarly, the mobile station encrypts data it transmits to the base station using the secret key. After a transmission received by the mobile station is decrypted, various control information, including the assigned power level, frequency, and time slot for a particular mobile station may be determined by the mobile station.

Generally, communication systems are described in terms of layers. The first layer, responsible for the actual transmission of a data carrying signal across the transmission medium, is referred to as the physical layer (PHY). The physical layer groups digital data and generates a modulated waveform based on the data in accordance with the particular transmission scheme. In GSM, the physical layer generates the transmission waveform and transmits during the assigned transmit time slot of the mobile station. Similarly, the receiving portion of the physical layer identifies data destined for the mobile station during the assigned receipt time slot.

The second layer, referred to as a protocol layer, processes digital data received by the physical layer to identify information contained therein. For example, in a GSM system, decryption of the data is a protocol layer function. Notice that changes in the operating parameters of the physical layer are identified only after decryption and processing by the protocol layer. Although this particular interdependency does not generally cause a problem in a purely hardware implementation, it may cause a problem when all or portions of the protocol layer are implemented in software.

Certain computer systems, especially portable notebook computers, may be equipped with wireless modems. One trend in modem technology involves the use of software modems that implement some of the real-time functions of traditional hardware modems using software routines. Because the hardware complexity of a software modem is less than a hardware counterpart, it is generally less expensive as well as more flexible. For example, the protocol layer decryption and processing may be implemented partially or entirely with software.

Software systems, such as PC systems, run interface control software in operating systems environments as software drivers. These drivers are responsible for communicating with the hardware devices and operate at a privileged level in the operating system. Other software applications are precluded from affecting the drivers. However, because drivers are not protected from other drivers, a variety of problems can occur that might affect the operation of a driver, such as by corrupting its operation. These effects may be caused accidentally, or may be caused by purposeful hacking. A corrupted (or co-opted) driver might cause additional problems outside the computer, such as causing a phone line or wireless channel to be used, operating an external peripheral, or deleting important data.

Because the operating parameters of the physical layer, which control the operation of the transmitter of the mobile station, are controlled by the protocol layer using software, it may be possible for a computer program or virus to take control of the mobile station and cause it to accidentally or purposefully transmit outside of its assigned time slot. A wireless communications network, such as a cellular network, relies on a shared infrastructure. A mobile station must adhere to the 'rules of the road' or it may cause interference on the network.

If certain functions of the mobile station are controlled in software, a programmer may determine how the GSM control frames are decoded and how the transmitter module is triggered. A virus may then be written and spread over the network to infiltrate the software-based mobile stations. Then, on a particular time and date, the virus could take direct control of the mobile station and transmit continuously or intermittently and inundate the base stations and other mobile units with random frequencies and full power. Such a virus design could enable and disable at random times to avoid detection, robbing the air-time supplier of some or all of his available bandwidth and may even cause a complete shutdown of the network. Such an attack may take only a few affected devices (i.e., as few as one) per cell to disable the cell completely.

The security problems associated with mobile stations operating in a shared infrastructure may be segregated into three levels of severity: tamper-proof, non-tamperproof, and class break. First, a hardware/firmware implementation (such as a cell-phone) is the hardest with which to tamper, because each device must be acquired individually and modified (i.e., tamper-proof). On the other hand, a software-based solution is easier to tamper with, as a hacker can concentrate on a software-only debugger environment (i.e., non-tamper-proof). Finally, a system with the ability to be tampered with that is similar on all systems and allows the tampering to be distributed to a large number of systems of the same type is susceptible to a 'class-break.'

A software wireless modem is susceptible not only to a class-break, but also it is among those devices whose code may be accessed from the same layer as IP (internet protocol) or another portable code access mechanism. Many software wireless modems may be integrated into computers coupled to networks or the Internet. Such an arrangement increases the susceptibility of the software to being tampered with and controlled.

Communication devices implementing other communications protocols using software may also be susceptible to some of the problems identified above, but to differing degrees and levels of consequence. For example, software drivers for communication devices using copper subscriber lines, such voice band modems (V.90), asymmetric digital subscriber line (DSL) modems, home phone line networks (HomePNA), etc., may be attacked, resulting in the subscriber line being disabled or improperly used. For example, a group of infected software modems may be used in a denial of service attack to continuously place calls to a predetermined number and overwhelm the destination. The software modem could also be used to prevent outgoing or incoming calls on the subscriber line or disrupt HomePNA traffic. Other wireless communication devices implemented in software, such as wireless network devices, could also be commandeered to disrupt traffic on the wireless network.

The present invention is directed to overcoming, or at least reducing the effects of, one or more of the problems set forth above.

SUMMARY OF THE INVENTION

One aspect of the present invention is seen a computer system including a peripheral device and a processing unit. The processing unit is adapted to execute a driver for interfacing with the peripheral device in a standard mode of operation and an authentication agent in a privileged mode of operation, wherein the authentication agent includes program instructions adapted to authenticate the driver. The peripheral device may comprise a communications device, such as a software modem.

Another aspect of the present invention is seen in a method for identifying security violations in a computer system. The method includes executing a driver in a standard processing mode of a processing unit; transitioning the processing unit into a privileged processing mode; and authenticating the driver in the privileged processing mode. The driver may be adapted for interfacing with a communications peripheral device, such as a software modem.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
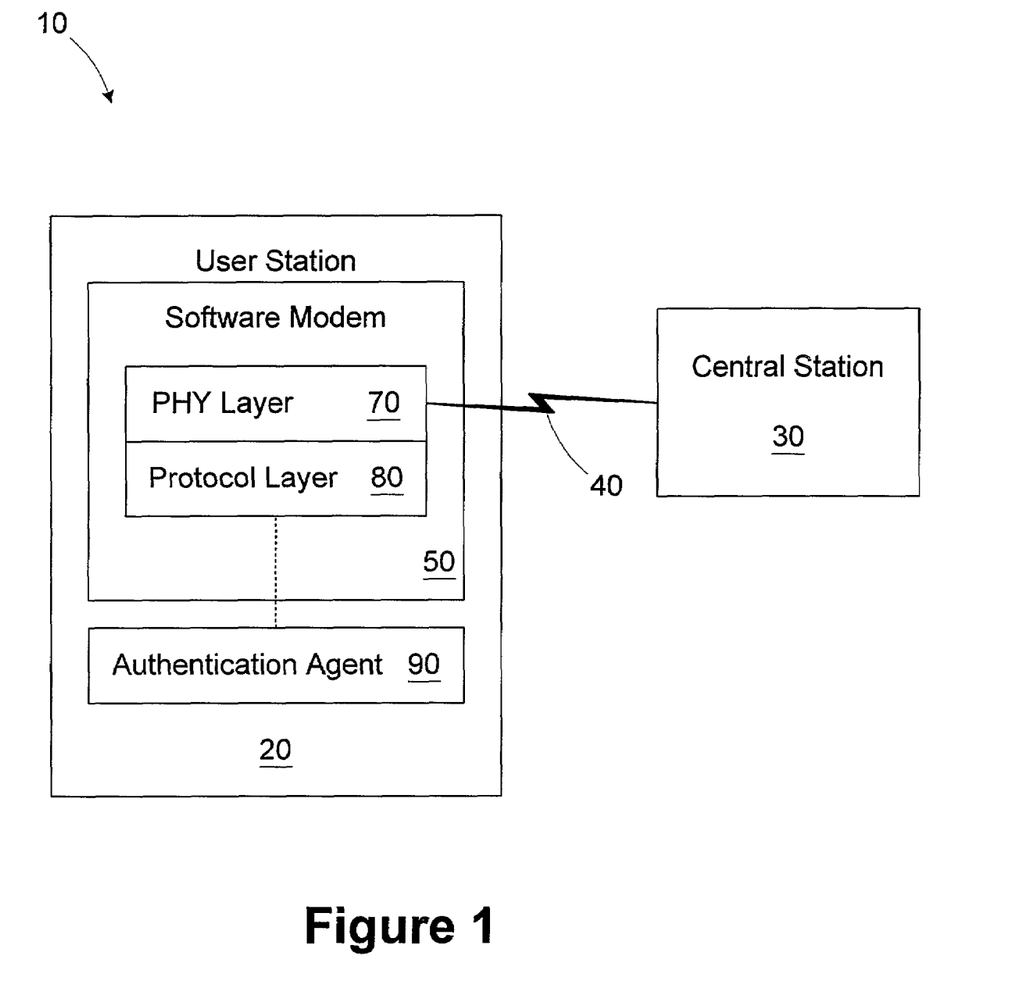
FIG. 1 is a simplified block diagram of a communications system including a user station having an authentication agent in accordance with one illustrative embodiment of the present invention.

Referring to FIG. 1, a block diagram of a communications system 10 is provided. The communications system 10 includes a user station 20 in communication with a central station 30 over a communication channel 40. In the illustrated embodiment, the user station 20 is a mobile computing device using a software modem 50 to communicate in accordance with a wireless communication protocol, such as GSM. The central station 30 may be a shared base station capable of serving a plurality of subscribers. Although the invention is described as it may be implemented in a wireless environment, its application is not so limited. The teachings herein may be applied to other communication environments using software implemented communication protocols (e.g., V.90, ADSL, HomePNA, Wireless LAN, etc.).

The user station 20 may comprise a variety of computing devices, such as a desktop computer, a notebook computer, a personal data assistant (PDA), etc. For purposes of illustration, the user station 20 is described as it may be implemented using a notebook computer. The software modem 50 may be installed as an internal resource. As will be appreciated by those of ordinary skill in the art, the software modem 50 includes a physical layer (PHY) 70 implemented in hardware and a protocol layer 80 implemented in software. For purposes of illustration, the functions of the software modem 50 are described as they might be implemented for a GSM communication protocol, although other protocols may be used.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The PHY layer 70 converts digital transmit signals into an analog transmit waveform and converts an incoming analog received waveform into digital received signals. For transmit signals, the output of the protocol layer 80 is the transmit "on-air" information modulated about a zero Hz carrier (i.e., a carrierless signal). The PHY layer 70 mixes (i.e., mixing may also be referred to as upconverting) the carrierless transmit signal generated by the protocol layer 80 in accordance with assigned time slot, frequency, and power level assignments communicated to the user station 20 by the central station 30 to generate the actual analog waveform transmitted by the PHY layer 70.

The central station 30 also communicates time slot and frequency assignments to the user station 20 for incoming data. The incoming analog receive waveform is sampled and downconverted based on the assigned time slot and frequency parameters to recreate a carrierless (i.e., modulated about zero Hz) receive waveform. The protocol layer 80 receives the carrierless receive waveform from the PHY layer 70 and performs baseband processing, decryption, and decoding to regenerate the received data.

Collectively, the time slot, frequency, and power level (i.e., for transmit data only) assignments are referred to as control codes. The particular algorithms used for implementing the software modem 50 are described by the particular industry standards (e.g., GSM standards) and are well known to those of ordinary skill in the art, so for clarity and ease of illustration they are not detailed herein, except as they are modified in accordance with the present invention.

The user station 20 also includes an authentication agent 90 adapted to periodically verify the authenticity of the protocol layer 80 to identify corruption or tampering. As will be described in greater detail below with reference to FIGS. 3 and 4, the authentication agent 90 operates in a privileged context with respect to software implementing functions of the protocol layer 80. Because the authentication agent 90 is protected, it allows detection of tampering related to the software implementing functions of the protocol layer 80 without being vulnerable to tampering itself.

Figure 2:
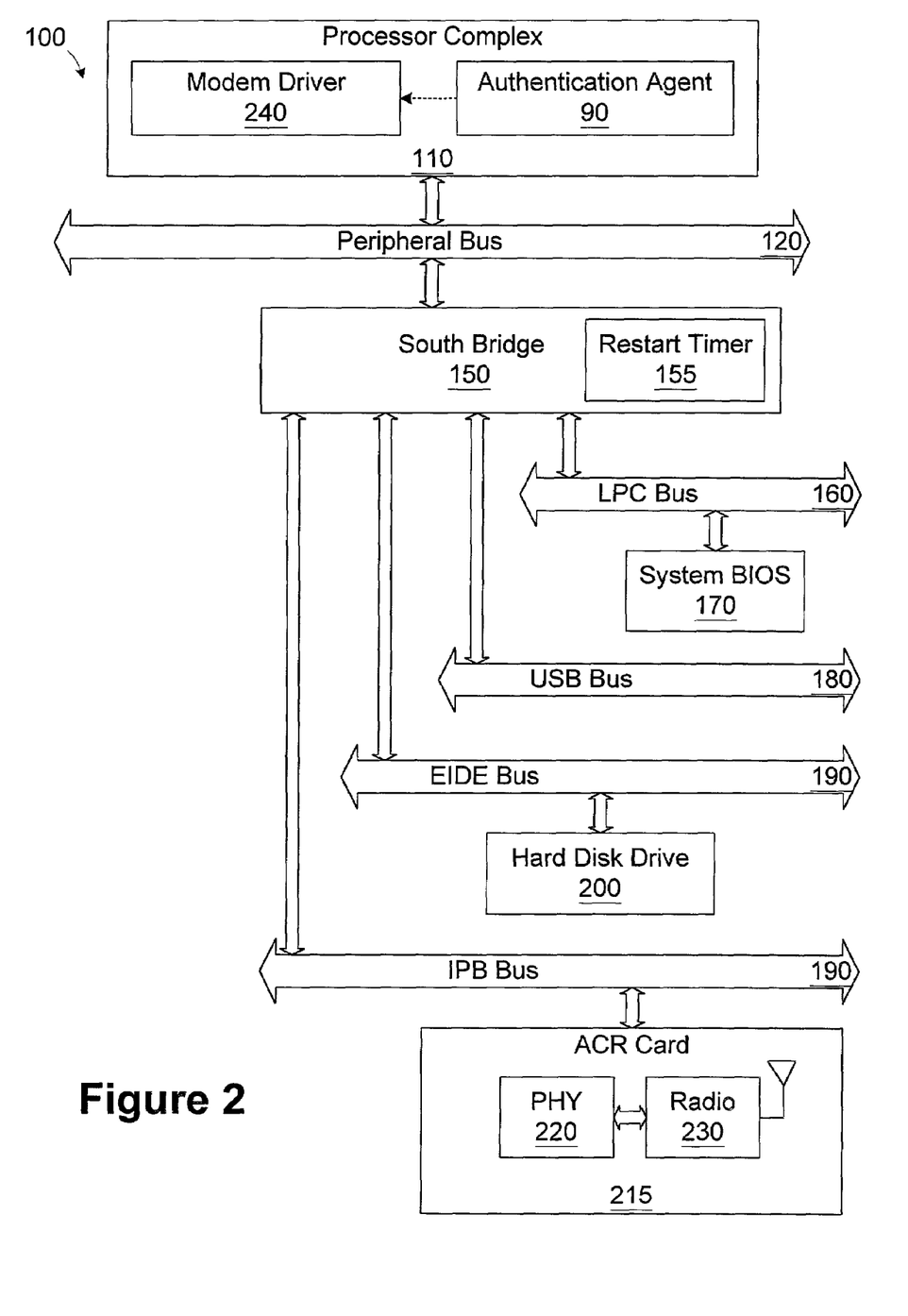
FIG. 2 is a simplified block diagram of an exemplary computer that embodies the user station in the communications system of FIG. 1.

Turning now to FIG. 2, a block diagram of the user station 20 embodied in a computer 100 is provided. The computer 100 includes a processor complex 110. For clarity and ease of understanding not all of the elements making up the processor complex 110 are described in detail. Such details are well known to those of ordinary skill in the art, and may vary based on the particular computer vendor and microprocessor type. Typically, the processor complex 110 includes a microprocessor, cache memories, system memory, a system bus, a graphics controller, and other devices, depending on the specific implementation.

The processor complex 110 has two modes of operation, a standard mode and a privileged mode. An exemplary privileged mode of operation, well known to those of ordinary skill in the art, is the System Management Mode (SMM). Entry into the SMM is initiated through a system management interrupt (SMI). In response to an SMI, the processor complex 110 executes SMM code previously loaded (i.e., during the initialization of the computer 100 and loading of the BIOS code) into a protected portion of the system memory not visible to any other processes (e.g., applications or drivers). The memory locations used to perform the functions of the processor complex 110 during the SMM event are also not apparent to any other process. Although the illustrative embodiment is described as it may be implemented using SMM as a privileged mode, the invention is not so limited, and a different type of privileged mode may be used. In general, a privileged mode is defined as a mode of operation not visible to other processes, such as applications or drivers, executing on the computer 100. SMM is simply one illustrative privileged mode currently available.

Other privileged contexts include the use of a separate processing entity, such as a cryptoprocessor, independent from the main system microprocessor. The functions of privileged mode software are executed by the cryptoprocessor and are thus secure from tampering by other software applications executing on the main system microprocessor. Still another privileged context is possible using a main system microprocessor having a secure architecture extension. In such an implementation, the cryptoprocessor is integrated into the main system microprocessor and controlled with secure commands.

The processor complex 110 is coupled to a peripheral bus 120, such as a peripheral component interface (PCI) bus. Typically a bridge unit (i.e., north bridge) in the processor complex 110 couples the system bus to the peripheral bus 120. A south bridge 150 is coupled to the peripheral bus 120. The south bridge 150 interfaces with a low pin count (LPC) bus 160 that hosts a system basic input output system (BIOS) memory 170, a universal serial bus (USB) 180 adapted to interface with a variety of peripherals (e.g., keyboard, mouse, printer, scanner, scanner) (not shown), an enhanced integrated drive electronics (EIDE) bus 190 for interfacing with a hard disk drive 200 and a CD-ROM drive (not shown), and an integrated packet bus (IPB) 210.

The IPB bus 210 hosts the hardware portion of the software modem 50. In the illustrated embodiment, the software modem 50 is hosted on an advanced communications riser (ACR) card 215. Specifications for the ACR card 215 and the IPB bus 210 are available from the ACR Special Interest Group (ACRSIG.ORG). The software modem 50 includes a PHY hardware unit 220 and a radio 230. In the illustrated embodiment, the radio 230 is adapted to transmit and receive GSM signals. Collectively, the PHY hardware unit 220 and the radio 230 form the PHY layer 70 (see FIG. 1).

The processor complex 110 executes program instructions encoded in a modem driver 240. Collectively, the processor complex 110 and the modem driver 240 implement the functions of the protocol layer 80 (see FIG. 1). The processor complex 110 also executes program instructions for implementing the authentication agent 90.

The modem driver 240 and/or the authentication agent 90 may be stored in a secure location, such as the system BIOS 170, a secure memory device on the ACR card 215, a secure memory device in the computer 100, etc. An exemplary technique for storing a secure driver is described in U.S. patent application Ser. No. 09/901,176 in the names of Terry L. Cole, David W. Smith, Rodney Schmidt, Geoffrey S. Strongin, Brian C. Barnes, and Michael Barclay, entitled, "PERIPHERAL DEVICE WITH SECURE DRIVER," and incorporated herein by reference in its entirety.

For incoming data received by the software modem 50, the modem driver 240 demodulates the carrier-less waveform to reconstruct encrypted data received by the PHY hardware 220. The process for reconstructing the encrypted data is well known to those of ordinary skill in the art, and is defined in industry GSM standards. For clarity and ease of illustration, the details of the reconstruction process are not included herein.

After reconstructing the encrypted data, the modem driver 240 decrypts the encrypted data using the industry standard decryption techniques defined by the GSM standards to generate decrypted data. The modem driver 240 decodes the decrypted data and extracts control codes and/or user data. The modem driver 240 passes the control codes to the PHY hardware 220. In turn, the PHY hardware 220 configures the radio 230 based on the assigned time slot, frequency, and power level information contained in the control codes.

For data being transmitted by the software modem 50, the modem driver 240 handles all the data processing functions, including encoding, interleaving, burst assembly, encryption, and baseband processing to generate the carrier-less transmit waveform. The modem driver 240 passes the transmit waveform to the PHY hardware 220 and radio 230 for upconverting in accordance with the assigned time slot, frequency, and power level previously defined by the control codes.

Periodically, the authentication agent 90 is invoked to verify the authenticity of the modem driver 240. The authentication agent 90 is invoked in a privileged context, such as by executing the authentication agent 90 in SMM, executing the authentication agent 90 using a cryptoprocessor, or executing the authentication agent 90 using a secure extension of the main system microprocessor.

Figure 3:
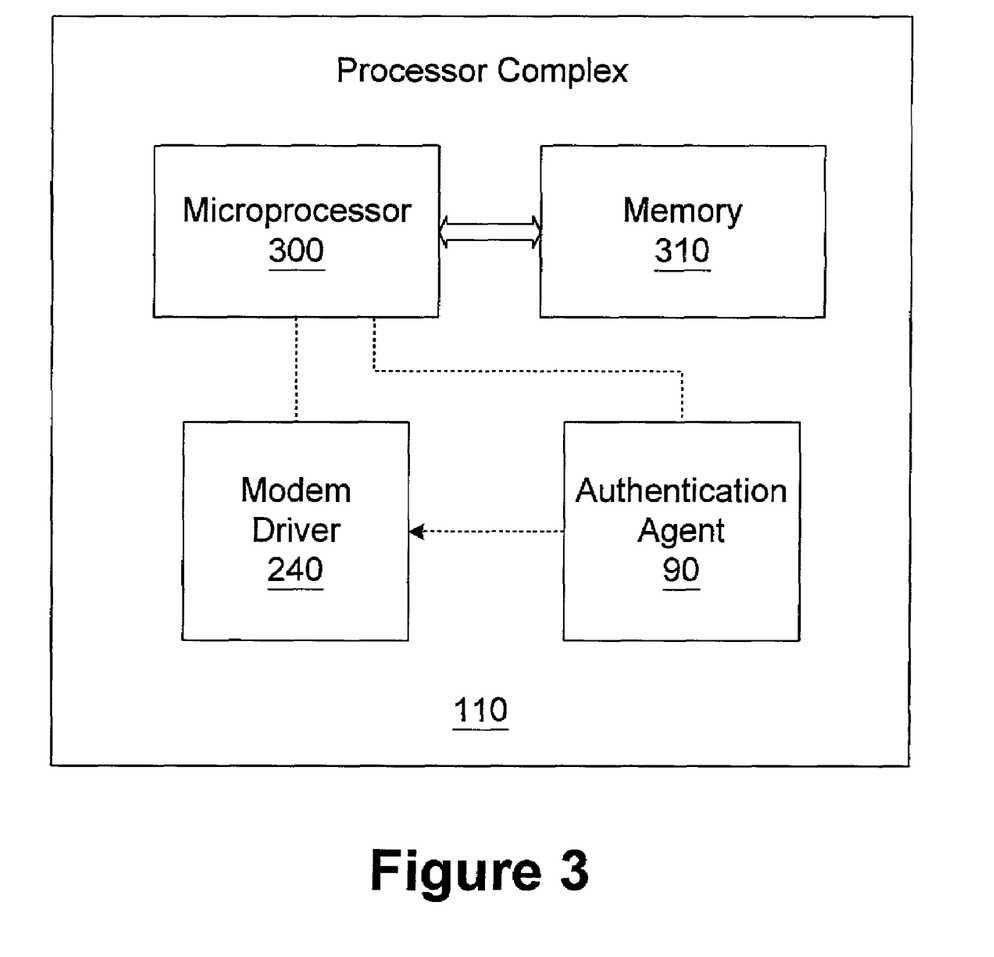
FIG. 3 is a simplified block diagram of the processor complex of FIG. 2 illustrating the execution of the authentication agent using an SMM or secure architectural extension implementation.

Referring briefly to FIG. 3, a simplified block diagram of the processor complex 110 of FIG. 2 illustrating the execution of the authentication agent 90 using an SMM or secure architectural extension implementation is shown. In the embodiment of FIG. 3, the processor complex 110 includes a microprocessor 300 that interfaces with a memory device 310. The microprocessor 300 executes the functions of the modem driver 240 in a standard mode of operation and the authentication agent 90 in a privileged mode of operation. For example, the authentication agent 90 may be invoked using a system management interrupt (SMI). The processor complex 110 transitions to privileged mode (i.e., SMM) in response to the SMI and executes the authentication agent 90. The authentication agent 90 authenticates the modem driver 240 as described in greater detail below. A portion of the system memory 310 may be designated as a shared mailbox for privileged mode activities. Applications operating in the standard mode, such as the modem driver 240, may place data in a designated inbox of the shared memory space, and applications running in the privileged mode, such as the authentication agent 90, may place data in a designated outbox of the shared memory space. The outbox may be designated as read-only for standard mode applications. An exemplary computer system having a shared mailbox for passing data between standard mode and privileged mode applications is described in U.S. patent application Ser. No. 09/853,447 in the names of Dale E. Gulick and Geoffrey S. Strongin, entitled "INTEGRATED CIRCUIT FOR SECURITY AND MANAGEABILITY," and incorporated herein by reference in its entirety.

The particular technique for invoking the authentication agent 90 and the frequency at which it is invoked may vary. For example, the modem driver 240 may call the authentication agent 90 at a predetermined frequency (e.g., every N frames). In an alternative embodiment, the authentication agent 90 may be invoked periodically by another process independent of the modem driver 240. For example the operating system under which the computer 100 operates may include a timer that is used to periodically initiate an SMI to invoke the authentication agent 90. In another embodiment, security hardware including a secure timer may be included in the computer 100 for periodically invoking the authentication agent 90. For example, a restart timer 155 (see FIG. 2), resident on the south bridge 150 may be used to periodically invoke the authentication agent 90 after a predetermined amount of time has elapsed. The particular operation of the restart timer 155 is described in greater detail in U.S. patent application Ser. No. 09/853,447, incorporated above.

Figure 4:
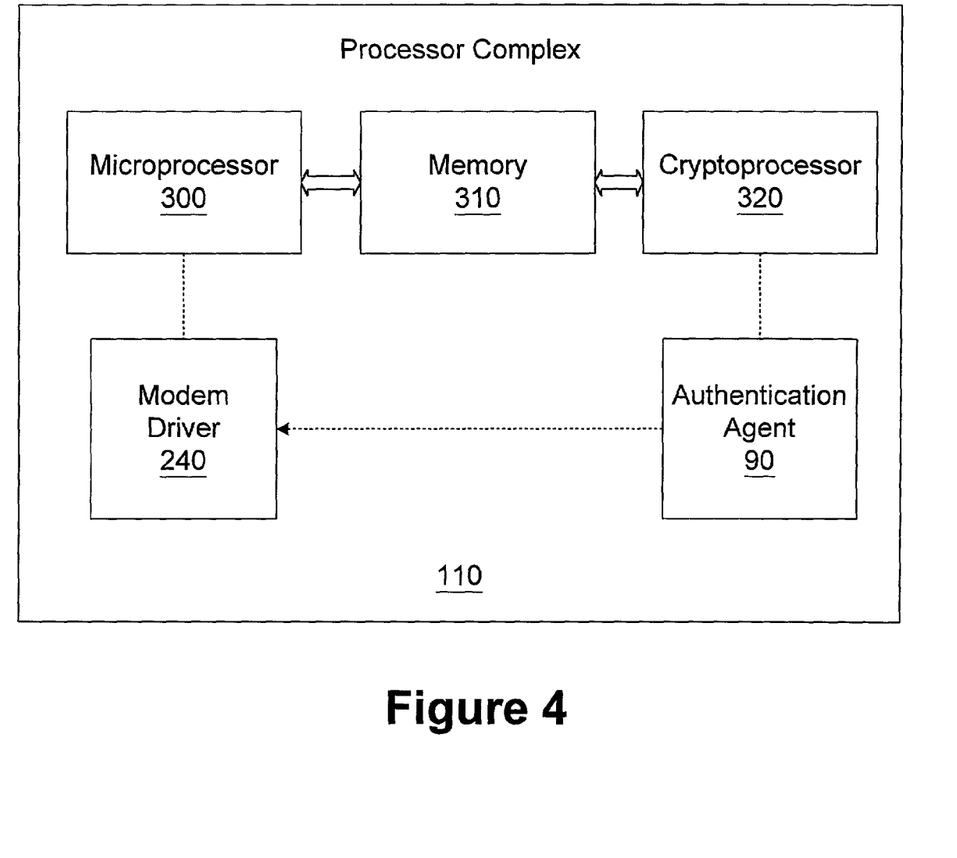
FIG. 4 is a simplified block diagram of the processor complex of FIG. 2 illustrating the execution of the authentication agent using a cryptoprocessor implementation.

Referring now to FIG. 4, a simplified block diagram of the processor complex 110 of FIG. 2 illustrating the execution of the authentication agent 90 using a cryptoprocessor implementation is shown. In the embodiment of FIG. 4, the processor complex 110 includes a cryptoprocessor 320 in addition to the microprocessor 300 and memory 310. The microprocessor 300 executes the functions of the modem driver 240 in a standard mode of operation, and the cryptoprocessor 320 executes the functions of the authentication agent 90 in a privileged mode of operation independent from the microprocessor 300. The cryptoprocessor may have its own memory resource or it may use a protected or non-overlapping portion of the memory 310.

The operation of the authentication agent 90 is now described in greater detail. The authentication agent 90 periodically authenticates the modem driver 240 to identify corruption or tampering. A variety of security techniques known in the art may be used to authenticate the modem driver 240. An exemplary technique involves the use of public and private keys and hashes to verify a digital signature. In a public key cryptography system, each user has two complementary keys, a publicly revealed key and a private key. Each key unlocks the code that the other key locks. Knowing the public key does not help in deducing the corresponding private key. The public key can be published and widely disseminated across a communications network. In the context of this application, a public key may be provided for the software driver 240 by the manufacturer or vendor (i.e., supplier). The public key may be stored in the computer 100, such as in the system BIOS 170 or on the ACR card 215.

The modem driver 250 may be signed with a digital signature by the supplier using a private key to encrypt a "hash" of the message. A digest is a cryptographically-strong, one-way hash function. It is somewhat analogous to a "checksum" or Cyclic Redundancy Check (CRC) error checking code, in that it compactly represents the modem driver 240 and is used to detect changes therein. Unlike a CRC, however, it is computationally infeasible, if not virtually impossible, for an attacker to devise a substitute program image that would produce an identical digest. The digest is encrypted by the private key, creating a digital signature of the modem driver 240. Various digest standards have been proposed, such as Secure Hash Algorithm (SHA) or Message Digest 5 (MD5).

The authentication agent 90 generate a hash of the modem driver 240 as it resides in memory and uses the public key to recreate the digest included in the digital signature associated with the modem driver 240. Either the entire image of the modem driver 240 may be included in the hash, or alternatively, a specified portion of the image may be selected. The digital signature used for authentication should correspond to the entire image or the portion of the image selected. Any changes to the modem driver 240 result in a corresponding change to the hash computed by the authentication agent. A changed hash will not match the digest recreated from the digital signature based on the public key. If the authentication agent 90 identifies a change to the modem driver 240, a variety of protective actions may be taken. For example, the authentication agent 90 may inhibit operation of the software modem 50 by disabling up the modem driver 240 or by entirely disabling the computer 100 by initiating an unrecoverable error condition.

By authenticating the modem driver 240, the authentication agent 90 may identify and stop attempts at surreptitious control of the modem 50 relatively quickly. As such, the potential for wide scale disruption of the communications network is reduced. The security of the software modem 50 is increased without sacrificing the flexibility and adaptability features inherent in its software implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer system, comprising:
a peripheral device;
a processing unit adapted to execute a driver for interfacing with the peripheral device in a standard mode of operation and an authentication agent in a privileged mode of operation, wherein the authentication agent includes program instructions adapted to authenticate the driver.

2. The system of claim 1, wherein the authentication agent includes program instructions adapted to signal a security violation in response to a driver authentication failure.

3. The system of claim 2, wherein the authentication agent includes program instructions adapted to prohibit further operation of the driver in response to identifying the security violation.

4. The system of claim 1, wherein the authentication agent includes program instructions adapted to generate a hash of at least a portion of the driver, decrypt a digest associated with the driver, and compare the hash to the digest to authenticate the driver.

5. The system of claim 4, wherein the authentication agent includes program instructions adapted to decrypt the digest associated with the driver using a public key.

6. The system of claim 1, wherein the processing unit includes a timer adapted to generate an interrupt signal for invoking the authentication agent after a predetermined interval.

7. The system of claim 1, wherein the driver includes program instructions adapted to periodically invoke the authentication agent.

8. The system of claim 1, wherein the privileged mode of operation comprises a system management mode of operation.

9. The system of claim 1, wherein the driver includes program instructions adapted to issue a signal to the processing unit to initiate a change from the standard mode of operation to the privileged mode of operation.

10. The system of claim 9, wherein the signal comprises a system management interrupt.

11. The system of claim 1, further comprising a system basic input output system (BIOS) memory adapted to store the authentication agent.

12. The system of claim 11, wherein the processing unit is adapted to load the authentication agent from the system BIOS into a protected memory location during initialization of the computer system.

13. The system of claim 12, wherein the authentication agent includes program instructions adapted to generate a hash of at least a portion of the driver, decrypt a digest associated with the driver using a public key, and compare the hash to the digest to authenticate the driver, and the system further comprises a system basic input output system (BIOS) memory adapted to store the public key.

14. The system of claim 1, wherein the authentication agent includes program instructions adapted to generate a hash of at least a portion of the driver, decrypt a digest associated with the driver using a public key, and compare the hash to the digest to authenticate the driver, and the peripheral device includes a memory device adapted to store the public key.

15. The system of claim 1, wherein the authentication agent includes program instructions adapted to prohibit further operation of the processing unit in response to identifying the security violation.

16. A communications system, comprising:
a physical layer hardware unit adapted to communicate data over a communications channel in accordance with assigned transmission parameters, the physical layer hardware unit being adapted to receive an incoming signal over the communications channel and sample the incoming signal to generate a digital received signal; and
a processing unit adapted to execute a modem driver in a standard mode of operation and an authentication agent in a privileged mode of operation, wherein the standard mode driver includes program instructions adapted to extract control codes from the digital received signal and configure the physical layer hardware assigned transmission parameters based on the control codes, and the authentication agent includes program instructions adapted to authenticate the modem driver.

17. The system of claim 16, wherein the authentication agent includes program instructions adapted to signal a security violation in response to a modem driver authentication failure.

18. The system of claim 17, wherein the authentication agent includes program instructions adapted to prohibit further operation of the modem driver in response to identifying the security violation.

19. The system of claim 16, wherein the authentication agent includes program instructions adapted to generate a hash of at least a portion of the modem driver, decrypt a digest associated with the modem driver, and compare the hash to the digest to authenticate the modem driver.

20. The system of claim 19, wherein the authentication agent includes program instructions adapted to decrypt the digest associated with the modem driver using a public key.

21. The system of claim 16, wherein the processing unit includes a timer adapted to generate an interrupt signal for invoking the authentication agent after a predetermined interval.

22. The system of claim 16, wherein the modem driver includes program instructions adapted to periodically invoke the authentication agent.

23. The system of claim 16, wherein the transmission assignments include at least one of a power level assignment, a frequency assignment, and a time slot assignment.

24. The system of claim 16, wherein the privileged mode of operation comprises a system management mode of operation.

25. The system of claim 16, wherein the modem driver includes program instructions adapted to issue a signal to the processing unit to initiate a change from the standard mode of operation to the privileged mode of operation.

26. The system of claim 25, wherein the signal comprises a system management interrupt.

27. The system of claim 16, wherein the processing unit comprises a computer.

28. The system of claim 27, wherein the computer includes:
a processor complex adapted to execute the program instructions in the modem driver and the authentication agent;
a bus coupled to the processor complex; and
an expansion card coupled to the bus, the expansion card including the physical layer hardware.

29. The system of claim 28, wherein the authentication agent includes program instructions adapted to generate a hash of at least a portion of the modem driver, decrypt a digest associated with the modem driver using a public key, and compare the hash to the digest to authenticate the modem driver, and the expansion card includes a memory device adapted to store the public key.

30. The system of claim 27, wherein the computer includes a system basic input output system (BIOS) memory adapted to store the authentication agent.

31. The system of claim 30, wherein the computer is adapted to load the privileged mode driver from the system BIOS into a protected memory location during initialization of the computer.

32. The system of claim 27, wherein the authentication agent includes program instructions adapted to generate a hash of at least a portion of the modem driver, decrypt a digest associated with the modem driver using a public key, and compare the hash to the digest to authenticate the modem driver, and the computer further comprises a system basic input output system (BIOS) memory adapted to store the public key.

33. The system of claim 16, wherein the authentication agent includes program instructions adapted to prohibit further operation of the processing unit in response to identifying the security violation.

34. A method for identifying security violations in a computer system, comprising:
executing a driver in a standard processing mode of a processing unit;
transitioning the processing unit into a privileged processing mode; and
authenticating the driver in the privileged processing mode.

35. The method of claim 34, further comprising signaling a security violation in response to a driver authentication failure.

36. The method of claim 35, farther comprising prohibiting further operation of the driver in response to identifying the security violation.

37. The method of claim 35, farther comprising prohibiting further operation of the processing unit in response to identifying the security violation.

38. The method of claim 34, wherein authenticating the driver includes:
generating a hash of at least a portion of the driver;
decrypting a digest associated with the driver; and
comparing the hash to the digest to authenticate the driver.

39. The method of claim 38, wherein decrypting the digest comprises decrypting the digest using a public key.

40. The method of claim 34, further comprising generating an interrupt signal for authenticating the driver in the privileged processing mode after a predetermined interval.

41. A system for identifying security violations, comprising:
means for executing a driver in a standard processing mode of a processing unit;
means for transitioning the processing unit into a privileged processing mode; and
means for authenticating the driver in the privileged processing mode.

* * * * *

UNITED STATES PATENT AND TRADEMARK OFFICE
CERTIFICATE OF CORRECTION

| | |
|---|---|
| PATENT NO. | : 7,206,933 B2 |
| APPLICATION NO. | : 09/901212 |
| DATED | : April 17, 2007 |
| INVENTOR(S) | : Geoffrey S. Strongin et al. |

Page 1 of 1

It is certified that error appears in the above-identified patent and that said Letters Patent is hereby corrected as shown below:

In column 13 line 4, (Claim 36) replace the word "farther" with the word --further--.

In column 13, line 7 (Claim 37) replace the word "farther" with the word --further--.

Signed and Sealed this

Twenty-fourth Day of July, 2007

JON W. DUDAS
*Director of the United States Patent and Trademark Office*